(12) United States Patent
Xi et al.

(10) Patent No.: US 10,347,921 B2
(45) Date of Patent: Jul. 9, 2019

(54) HEADER FLANGE TO EVENLY DISTRIBUTE CONTACT PRESSURE ACROSS SEALS

(71) Applicants: GM GLOBAL TECHNOLOGY OPERATIONS LLC, Detroit, MI (US); Honda Motor Co., Ltd., Tokyo (JP)

(72) Inventors: Liang Xi, Madison Heights, MI (US); Xi Yang, Bloomfield Hills, MI (US); Ishida Kentaro, Tokyo (JP); Siguang Xu, Rochester Hills, MI (US); Satoshi Oyama, Tokyo (JP); Yu Tomana, Tokyo (JP); Richard D. Blakeley, Ortonville, MI (US)

(73) Assignees: GM Global Technology Operations LLC., Detroit, MI (US); Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 15/436,205

(22) Filed: Feb. 17, 2017

(65) Prior Publication Data
US 2018/0241053 A1 Aug. 23, 2018

(51) Int. Cl.
| | | |
|---|---|---|
| *H01M 8/00* | (2016.01) | |
| *H01M 8/0271* | (2016.01) | |
| *H01M 8/247* | (2016.01) | |
| *H01M 8/0276* | (2016.01) | |
| *H01M 8/2483* | (2016.01) | |

(52) U.S. Cl.
CPC ....... *H01M 8/0271* (2013.01); *H01M 8/0276* (2013.01); *H01M 8/247* (2013.01); *H01M 8/2483* (2016.02)

(58) Field of Classification Search
CPC .................. H01M 8/0258; H01M 8/0271
See application file for complete search history.

(56) References Cited

U.S. PATENT DOCUMENTS

| | | | |
|---|---|---|---|
| 5,700,016 A * | 12/1997 | Miyaoh | F16J 15/0825 277/591 |
| 2005/0249996 A1 | 11/2005 | Meacham | |
| 2007/0184328 A1* | 8/2007 | Frederiksen | H01M 8/0247 429/457 |
| 2009/0197147 A1 | 8/2009 | Fly et al. | |

* cited by examiner

*Primary Examiner* — Cynthia H Kelly
*Assistant Examiner* — Monique M Wills
(74) *Attorney, Agent, or Firm* — Quinn IP Law (57) ABSTRACT

Systems and methods including a header flange to evenly distribute contact pressure across seals include, in some aspects, a plate including a bead and a flange edge. The bead includes a bead-side and a bead-corner. The flange edge defines an aperture through the plate. The flange edge also includes a first edge-portion proximate the bead-side and a second edge-portion proximate the bead-corner. The bead-side and the first edge-portion define a first edge-distance therebetween. The bead-corner and the second edge-portion define a second edge-distance therebetween. The second edge-distance is greater than the first edge-distance.

19 Claims, 6 Drawing Sheets

HEADER FLANGE TO EVENLY DISTRIBUTE CONTACT PRESSURE ACROSS SEALS

CROSS-REFERENCE TO RELATED APPLICATION

This application is related to co-pending U.S. patent application Ser. No. 15/436,207 filed Feb. 17, 2017, titled "Header Design Employing Generally Regular Shapes," which is herein incorporated by reference in its entirety.

INTRODUCTION

The disclosure relates to the field of fuel cells and, more specifically, to systems and methods for evenly distributing contact pressure across seals.

Fuel-cell systems can be used as a power source in a wide variety of applications to provide electrical energy. The generated electrical energy may be immediately used to power a device such as an electric motor. Additionally or alternatively, the generated electrical energy may be stored for later use by employing, for example, batteries.

In some applications, fuel cells are incorporated into stationary structures to provide electric power to buildings, residences, and the like. In some applications, fuel cells are incorporated into devices such as smart phones, video cameras, computers, and the like. In some applications, fuel cells are incorporated into vehicles to provide or supplement motive power.

Fuel-cell systems generally include fuel cells arranged in a fuel-cell stack. The fuel-cell stack, which can contain more than one-hundred plates, is compressed to apply a contact pressure to seals between adjacent components of the fuel-cell stack to prevent leakage of fluids flowing therethrough. For example, coolant mixing the reactants or the reactants mixing away from the active areas of the fuel cells reduces effectiveness of the fuel-cell stack. Because of the number of components, even minor differences in contact pressure distribution along the seals become amplified across the stack, which can prevent formation of fluid-tight seals.

Accordingly, it would be beneficial to evenly distribute contact pressure across seals of the fuel-cell stack.

In some aspects, a plate includes a bead and a flange edge. The bead includes a bead-side and a bead-corner. The flange edge defines an aperture through the plate. The flange edge includes a first edge-portion proximate the bead-side and a second edge-portion proximate the bead-corner. A first edge-distance is defined between the bead-side and the first edge-portion. A second edge-distance is defined between the bead-corner and the second edge-portion, the second edge-distance is greater than the first edge-distance.

In some aspects, the bead includes a sealing surface thereon. The sealing surface is configured to deflect when exposed to a contact pressure.

In some further aspects, a third edge-distance is defined between a second bead-corner and a third edge-portion, the third edge-portion is proximate the second bead-corner, the bead-corner defines a first radius and the second bead-corner defines a second radius, the second radius is greater than the first radius, and the second edge-distance is greater than the third edge-distance.

In some further aspects, the bead-side follows a serpentine path, and the first edge-portion follows the serpentine path such that the first edge-distance is generally constant along the serpentine path.

In some further aspects, the first edge-distance and the second edge-distance are configured to provide a contact pressure having less than about 50% variance along the bead.

In some further aspects, the first edge-distance and the second edge-distance are configured to provide a contact pressure having less than about 30% variance along the bead.

In some further aspects, the bead generally defines a first polygon and the flange edge generally defines a second polygon, the second polygon includes more corners than the first polygon.

In some further aspects, the bead-side is generally linear and the bead-corner is generally radiused.

In some further aspects, the first edge-portion is generally radiused and the second edge-portion is generally linear.

In some aspects, a system includes a first plate, a second plate, and a compressive member. The first plate includes a bead and a flange. The bead has a bead-side and a bead-corner. The flange edge defines a first aperture through the first plate. The flange edge includes a first edge-portion proximate the bead-side and a second edge-portion proximate the bead-corner. The bead-side and the first edge-portion define a first edge-distance therebetween. The bead-corner and the second edge-portion define a second edge-distance therebetween. The second edge-distance is greater than the first edge-distance. The second plate abuts the first plate. The second plate includes a second aperture therethrough. The second aperture is aligned with the first aperture. The compressive member is configured to exert a compressive force on the first plate and the second plate. The compressive force is configured to seal the first plate and the second plate along the bead.

In some further aspects, the second plate further includes a second bead and a second flange edge. The second bead has a second bead-side and a second bead-corner. The second flange edge defines the second aperture. The second flange edge includes a third edge-portion proximate the second bead-side and a fourth edge-portion proximate the second bead-corner. The second bead-side and the third edge-portion define a third edge-distance therebetween. The second bead-corner and the fourth edge-portion define a fourth edge-distance therebetween. The fourth edge-distance is greater than the third edge-distance.

In some further aspects, the first plate further includes a first working face and a first rear face. The first working face has the bead disposed thereon. The first rear face is opposite the first working face. The second plate further includes a second working face and a second rear face. The second working face has the bead disposed thereon. The second rear face is opposite the second working face. The first rear face is disposed adjacent the second rear face. The first plate is attached to the second plate. The bead produces a first contact pressure distribution with a portion of relatively higher contact pressure. The second bead produces a second contact pressure distribution with a portion of relatively lower contact pressure. The bead and the second bead are cooperatively configured such that the portion of relatively higher contact pressure is disposed relatively adjacent the portion of relatively lower contact pressure.

In some further aspects, the bead produces a first contact pressure distribution with a portion of relatively higher contact pressure, the second bead produces a second contact pressure distribution with a portion of relatively lower contact pressure, and a first sealing surface of the bead abuts a second sealing surface of the second bead such that the portion of relatively higher contact pressure abuts the portion of relatively lower contact pressure.

In some further aspects, the first edge-portion is generally radiused and the second edge-portion is generally linear.

In some further aspects, the bead-side follows a serpentine path, and the first edge-portion follows the serpentine path such that the first edge-distance is generally constant along the serpentine path.

In some further aspects, the first edge-portion is generally radiused and the second edge-portion is generally linear.

In some aspects, a fuel-cell stack includes a first plate, a second plate, a unified electrode assembly, and a compressive member. The first plate includes a first working face, a first rear face, a bead, and a first flange edge. The first working face defines a plurality of first reactant channels. The first rear face is opposite the first working face. The bead is disposed on the first working face. The bead has a bead-side and a bead-corner. The first flange edge defines a first aperture through the first plate. The first flange edge includes a first edge-portion proximate the bead-side and a second edge-portion proximate the bead-corner. The first edge-portion and the bead-side define a first edge-distance therebetween. The second edge-portion and the bead-corner define a second edge-distance therebetween. The second edge-distance is greater than the first edge-distance. The second plate includes a second working face, a second rear face, and a second flange edge. The second working face defines a plurality of second reactant channels. The second rear face is opposite the second working face. The second flange edge defines a second aperture through the second plate. The second aperture is aligned with the first aperture. The unified electrode assembly is disposed between the first plate and the second plate. The unified electrode assembly includes a first side contacting the plurality of first reactant channels and a second side contacting the plurality of second reactant channels. The compressive member is configured to exert a compressive force on each of the first plate, the second plate, and the unified electrode assembly. The compressive force is configured to apply a contact pressure to the bead to provide a substantially fluid-tight seal between the bead and an adjacent component.

In some further aspects, the substantially fluid-tight seal is provided between the bead and the second plate.

In some further aspects, the bead-side is generally linear and the bead-corner is generally radiused.

In some further aspects, the first edge-distance and the second edge-distance are configured to provide less than about 50% variance of the contact pressure along the bead.

The above features and advantages and other features and advantages of the present disclosure are readily apparent from the following detailed description when taken in connection with the accompanying drawings.

BRIEF DESCRIPTION OF THE DRAWINGS

The accompanying drawings are illustrative and not intended to limit the subject matter defined by the claims. Exemplary aspects are discussed in the following detailed description and shown in the accompanying drawings in which:

DETAILED DESCRIPTION

Figure 1:
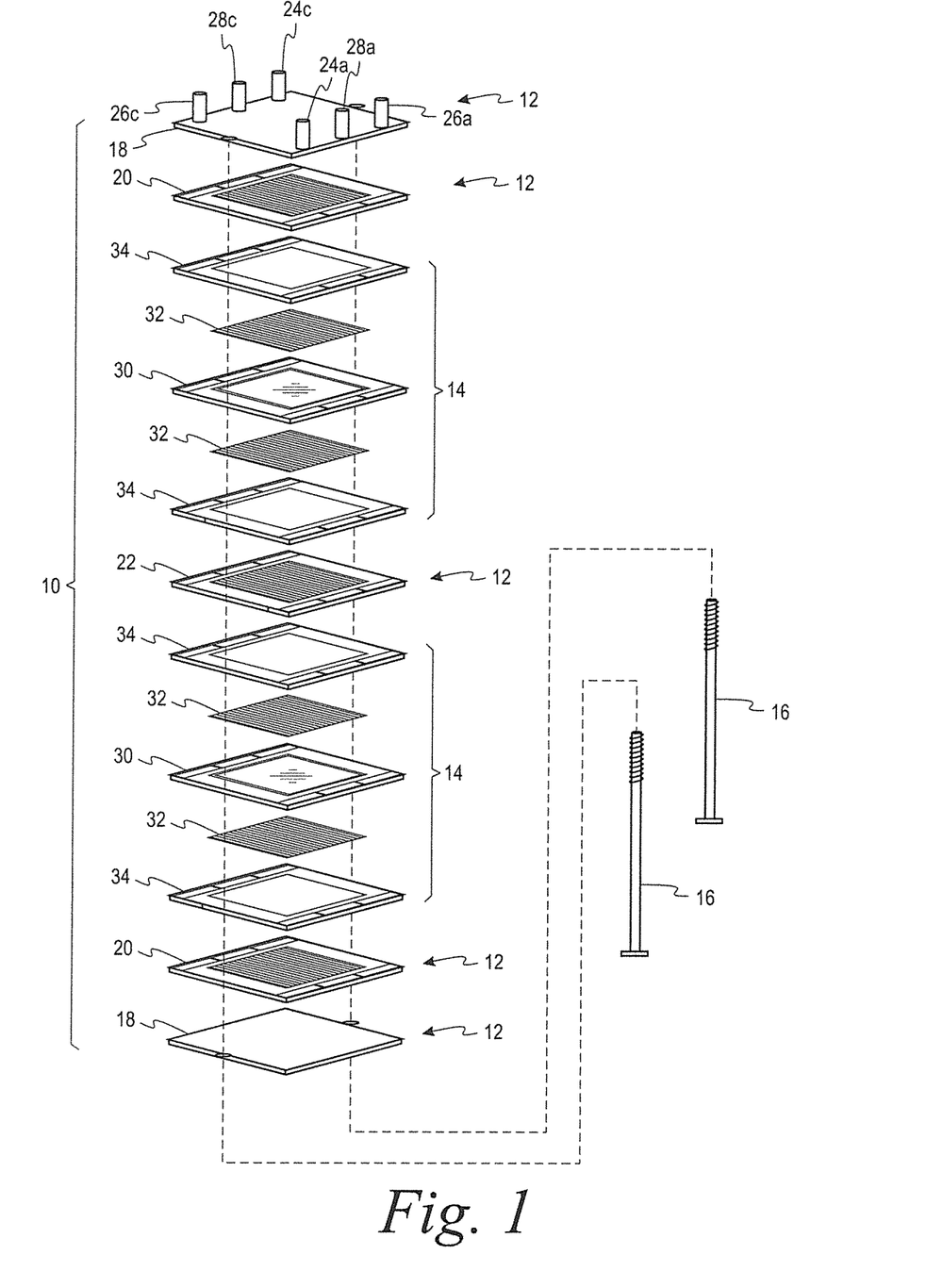
FIG. 1 is an exploded schematic view of a fuel-cell stack according to aspects of the present disclosure.

FIG. 1 is an exploded view of a fuel-cell stack 10. The fuel-cell stack 10 includes a plurality of plates 12, at least one unified electrode assembly 14, and a compressive member 16. The plurality of plates 12 may include any suitable combination of plates 12. For example, the plurality of plates 12 may include endplates 18, monopolar plates 20 (shown in greater detail in FIG. 2), and/or bipolar plates 22 (shown in greater detail in FIG. 4). According to some aspects of the present disclosure, any or all seals between the plurality of plates 12, the at least one unified electrode assembly 14, and the compressive member 16 can be configured to evenly distribute contact pressure across the seals by controlling flange design as described herein.

The endplates 18 are disposed at the top and bottom of the fuel-cell stack 10. The endplates 18 include fuel inlets 24$a$, fuel outlets 24$c$, oxidant inlets 26$a$, oxidant outlets 26$c$, coolant inlets 28$a$, and coolant outlets 28$c$ disposed thereon. As used herein, "fluids" can refer to fuels, oxidants, coolants, or any combination thereof as the context dictates and "reactants" can refer to fuels, oxidants, or both as the context dictates. For example, "fluid inlets 24$a$, 26$a$, 28$a$" can refer to any or all of fuel inlets 24$a$, oxidant inlets 26$a$, or coolant inlets 28$a$ as the context dictates and "reactant channels 24$b$, 26$b$" can refer to either or both of fuel channels 24$b$ and oxidant channels 26$b$ as context dictates. It is contemplated that certain of the fluid inlets 24$a$, 26$a$, 28$a$ and fluid outlets 24$c$, 26$c$, 28$c$ can be located on one endplate 18 with the remaining fluid inlets 24$a$, 26$a$, 28$a$ and fluid outlets 24$c$, 26$c$, 28$c$ being located on the opposite endplate 18.

The unified electrode assembly 14 includes a fuel cell 30 disposed between diffusion media 32. The fuel cell 30 may be, for example, a membrane electrode assembly that includes a membrane disposed between a cathode and an anode. The membrane may be, for example, a proton-exchange membrane. The cathode and anode may include, for example, a finely divided catalyst supported on carbon particles and mixed with an ionomer. In some aspects, the catalyst is platinum.

The diffusion media 32 are porous layers that facilitate delivery of reactants to the fuel cell 30. The reactants can include any suitable fuel and oxidant combination. For example, the fuel may be hydrogen and the oxidant may be oxygen. In a hydrogen fuel cell 30, hydrogen and oxygen react to produce electricity with heat and water as by-products. Other fuels can be used such as natural gas, methanol, gasoline, and coal-derived synthetic fuels, for example. In some aspects, the diffusion medium 32 is attached to a surface of the fuel cell 30 using lamination, adhesion, or any other suitable method. In some aspects, the diffusion medium 32 abuts the surface of the fuel cell, but is not adhered thereto. For example, the diffusion medium 32 may be placed against the surface of the fuel cell 30 and held in place by a retaining member 34. The retaining member 34 can be, for example, a gasket.

The compressive member 16 applies a compressive force to the fuel-cell stack 10 along the stacking direction. The compressive force secures the plates 12 and fuel cells 30 in position through a contact pressure between adjacent components. In some aspects, the compressive member 16 includes a plurality of threaded rods that engage structures on the endplates 18. By tightening the threaded rods, a compressive force is increased to a desired level along the stacking direction which results in a contact pressure being distributed along seals between adjacent components. In some aspects, the compressive members 16 engage less than the entire fuel-cell stack 10. For example, compressive members 16 may engage two adjacent plates 12 to apply a compressive force to the two plates 12 or may engage a number of adjacent plates 12 to apply a compressive force to the number of adjacent plates 12.

Figure 2:
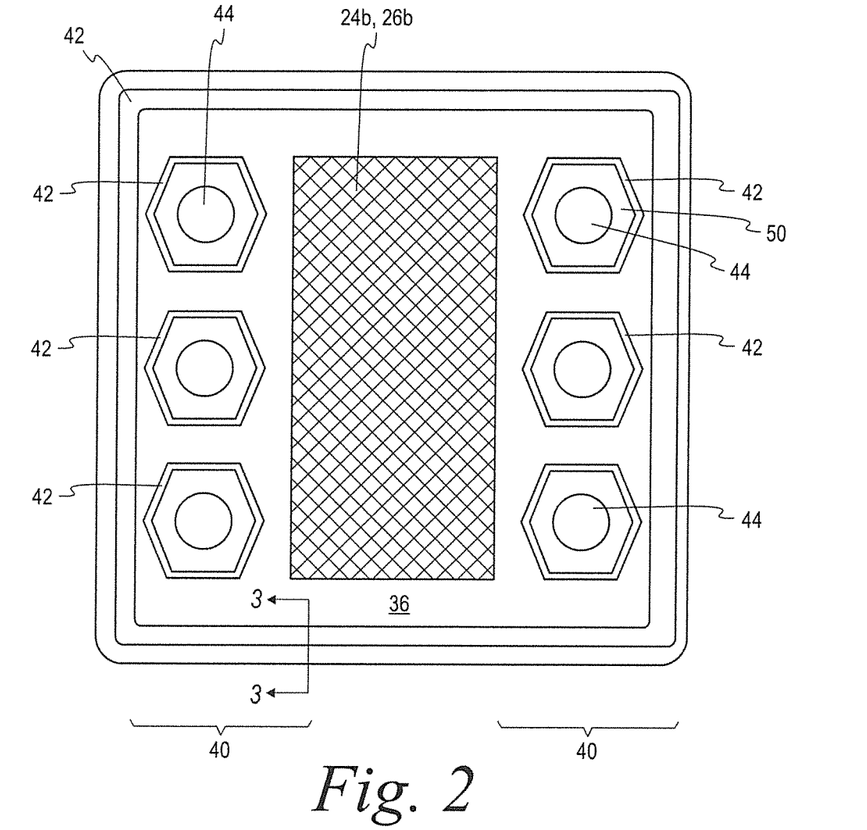
FIG. 2 is a schematic plan view of a monopolar plate of the fuel-cell stack of FIG. 1 according to aspects of the present disclosure.

FIG. 2 is a plan view of an example monopolar plate 20 of the fuel-cell stack 10. The monopolar plate 20 is a generally planar sheet having a working face 36, a rear face 38 opposite the working face, header portions 40, and beads 42. The illustrated monopolar plate 20 is a metal sheet defining structures thereon. The structures are formed by stamping the metal sheet. It is contemplated that other materials such as carbon fiber and other methods of formation such as molding and additive manufacturing may be used to form the monopolar plate 20.

Reactant channels 24b, 26b are defined on the working face 36 of the monopolar plate 20. The reactant channels 24b, 26b of a particular monopolar plate 20 are either fuel channels 24b or oxidant channels 26b. The reactant channels 24b, 26b distribute fluid flowing therethrough over the face of an adjacent unified electrode assembly 14 or fuel cell 30. For example, the fuel channels 24b distribute hydrogen to the anode of the fuel cell 30 and the oxidant channels 26b distribute oxygen to the cathode of the fuel cell 30.

The header portion 40 is disposed in a peripheral area of the monopolar plate 20 and defines a plurality of apertures 44 extending through the monopolar plate 20. The apertures 44 allow fluid to flow from one side of the monopolar plate 20 to the other side of the monopolar plate 20.

The beads 42 extend from the working face 36 of the monopolar plate 20. At least one bead 42 is disposed along a periphery of the working face 36 of the monopolar plate 20 to inhibit leakage of fluid from, for example, the reactant channels 24b, 26b to outside of the monopolar plate 20 (e.g., leaking to the environment or to the fuel-cell stack 10). Additional beads 42 are disposed adjacent to and surrounding each aperture 44. The beads 42 surrounding each aperture inhibit leakage of fluid from the aperture to the fluid channels 24b, 26b, 28b of the monopolar plate 20. For example, the bead 42 surrounding an aperture 44 with coolant flowing therethrough inhibits the coolant from leaking into the reactant channels 24b, 26b of the monopolar plate 20 and mixing with the reactant flowing therethrough. It is contemplated that a bead 42 may surround more than one aperture 44.

Optionally, coolant channels 28b may be defined on the rear face 38 of the monopolar plate 20. The coolant channels 28b distribute coolant flowing therethrough over the rear face 38 of the monopolar plate 20 to remove heat generated during the chemical reaction. Additionally, the coolant channels 28b can be used to deliver heat to the fuel cells 30 to facilitate the chemical reaction, for example, in cold operating conditions. It is contemplated that beads 42 and other features may extend from the rear face 38 of the monopolar plate 20.

Figure 3:
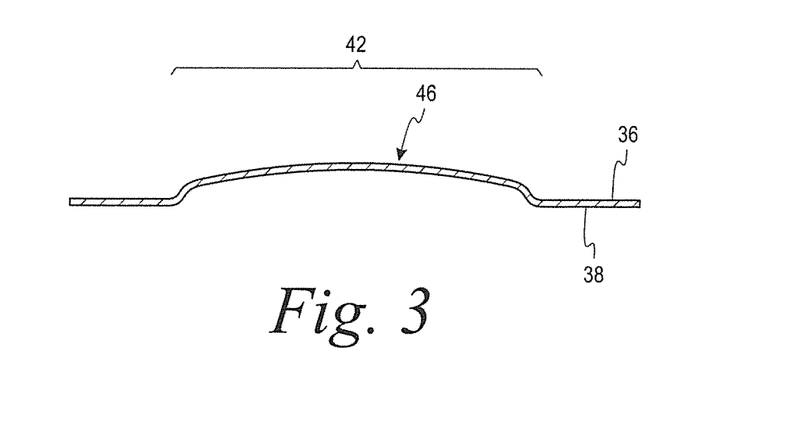
FIG. 3 is a schematic cross-sectional illustration of the plate of FIG. 2.

FIG. 3 is a cross-sectional illustration of the bead 42 of the monopolar plate 20 taken along line 3-3. The bead 42 defines a generally arcuate shape. The bead 42 defines a sealing surface 46 on the working face 36. The sealing surface 46 is configured to contact a component adjacent to the working face 36 of the monopolar plate 20. The sealing surface 46 will form a fluid-tight seal with the adjacent component when the contact pressure at all points on the bead 42 exceeds a certain threshold.

The beads 42 form a resilient structure that deflects when pressure is applied. The deflection increases the portion of the sealing surface 46 in contact with the adjacent component. While the illustrated bead 42 is generally arcuate in cross-section, it is contemplated that other shapes can be used. In some non-limiting examples, the cross-sectional profile of the bead 42 is generally rectangular, generally trapezoidal, generally linear sidewalls with an arcuate portion spanning therebetween, combinations thereof, or the like, Further, while the illustrated bead 42 is generally symmetrical, it is contemplated that asymmetrical beads 42 can be used.

Figure 4:
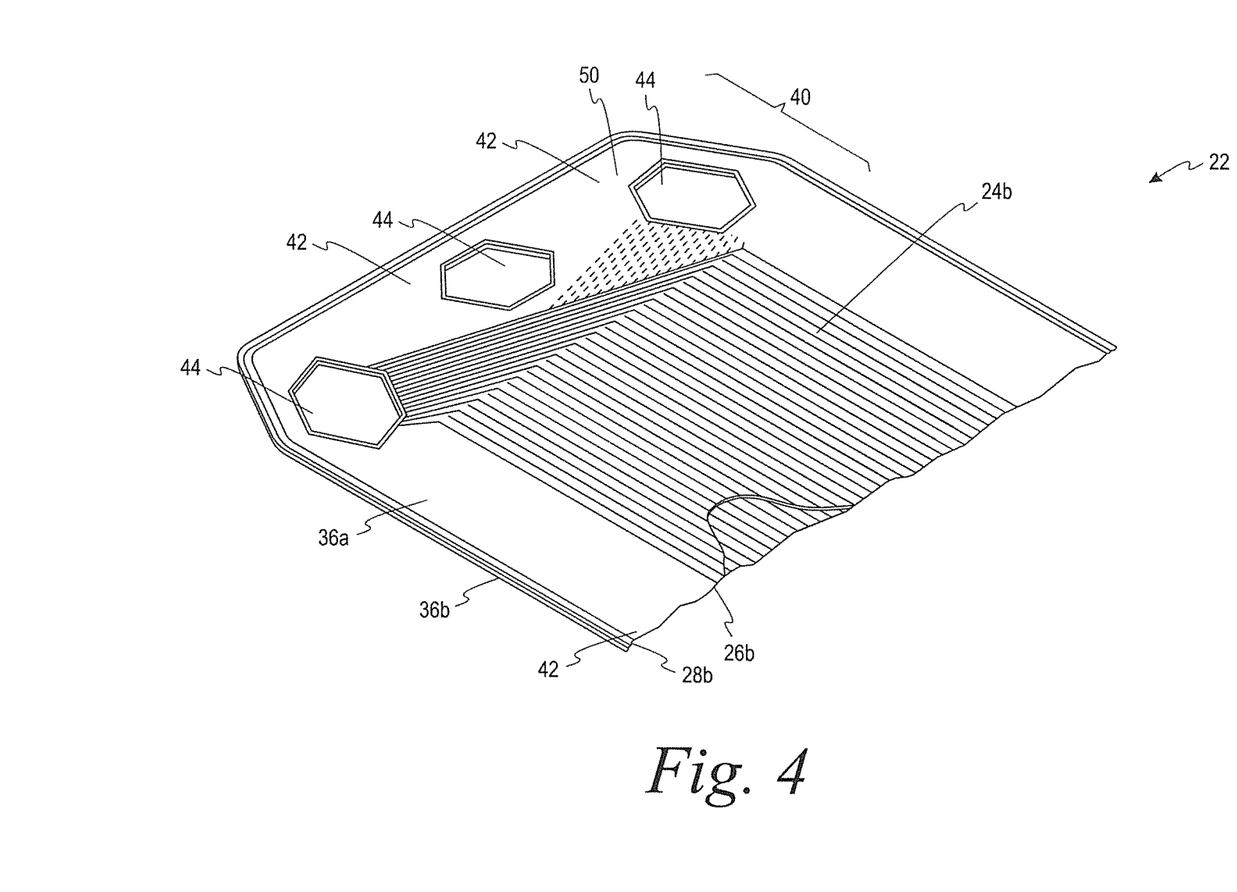
FIG. 4 is a schematic isometric view of a bipolar plate, shown in partial cross-section.

FIG. 4 is an isometric view of the bipolar plate 22 in partial cross-section. Bipolar plates 22 can be formed in various ways. For example, the rear faces 38 of two monopolar plates 20 can be placed together and the monopolar plates 20 bonded to form the bipolar plate 22. The bond can be formed by, for example, welding or use of an adhesive.

The bipolar plate 22 includes a first working face 36a opposite a second working face 36b. Each working face 36 defines reactant channels 24b, 26b thereon. For example, the first working face 36a defines the fuel channels 24b while the second working face 36b defines the oxidant channels 26b. Placing the rear faces 38 of the two monopolar plates 20 together results in coolant channels 28b being defined by space between the two monopolar plates 20 as is illustrated in FIG. 4.

Bipolar plates 22 can be also be formed using a variety of methods such as 3D-printing. In some aspects, the bipolar plate 22 is formed by stamping reactant channels 24b, 26b onto opposite faces of a single sheet without the presence of cooling channels 28b therebetween.

When the fuel-cell stack 10 is assembled, the apertures 44 in the header portions 40 of each plate 12 are substantially aligned with respective apertures 44 of adjacent plates 12 or unified electrode assemblies 14 to form a plurality of inlet manifolds (not shown) and a plurality of outlet manifolds (not shown). The beads 42 of each component are compressed against beads 42 of adjacent components such that fluid-tight seals are formed to define a plurality of fluid flowpaths 24, 26, 28. The fuel flowpath 24 is defined by the fuel inlet 24a, a fuel inlet manifold (not shown), fuel channels 24b of respective plates 12, a fuel outlet manifold (not shown), and fuel outlet 24c. Similarly, an oxidant flowpath 26 is defined by the oxidant inlet 26a, an oxidant inlet manifold (not shown), the oxidant channels 26b, and oxidant outlet manifold (not shown), and the oxidant outlet 26c. The coolant flowpath 28 includes the coolant inlet 28a, a coolant inlet manifold (not shown), the coolant channels 28b, a coolant outlet manifold (not shown), and a coolant outlet 28c.

When in operation, at least two fluids flow through the fuel-cell stack 10 in separate fluid flowpaths 24, 26, 28. In some example fuel-cell stacks 10, the fluids enter the fluid inlets 24a, 26a, 28a, flow through a respective manifold along a peripheral side of the fuel-cell stack 10, traverse the components in a lateral direction via the fluid channels 24b, 26b, 28b, flow through a respective manifold on an opposite peripheral side of the fuel-cell stack 10, and exit the fuel-cell stack 10 via the fluid outlets 24c, 26c, 28c. In some examples, at least two of the fluids flow in a counter-current configuration.

A substantially fluid-tight seal is formed between fuel-cell stack 10 components to inhibit undesirable mixing of the fluids flowing through the fuel-cell stack 10. These substantially fluid-tight seals are formed by applying contact pressure to the sealing surfaces 46. It is believed that differences in contact pressure along the sealing surfaces 46 of the beads 42 contribute to leaks. It is also believed that evenly distributing the contact pressure along the sealing surfaces 46 of the beads 42 can beneficially affect properties of the fuel-cell stack 10. For example, systems, components, and methods consonant with the present disclosure can increase seal effectiveness by evenly distributing the contact pressure across the header portions 40 of the plates 12. Further, systems, components, and methods consonant with the present disclosure can also reduce cost of manufacturing components by reducing the amount of compressive force required to maintain adequate contact pressure through the stack. Yet further, systems, components, and methods consonant with the present disclosure can also positively affect longevity of the fuel-cell stack by reducing the maximum contact pressure applied to the components.

The contact pressure applied to the sealing surfaces 46 results from the compressive force applied to the fuel-cell stack 10 and should be maintained above a threshold level to maintain the substantially fluid-tight seals. Because the fuel-cell stack 10 can include a substantial number of components, even minor variations in distribution of the contact pressure along the beads 42 can be greatly amplified when the components are assembled in the fuel-cell stack 10.

Beneficially, contact pressure distribution along the sealing surface 46 of a bead 42 surrounding an aperture 44 can be evenly distributed by varying an edge distance D about a flange 50 between the aperture 44 and the bead 42.

Figure 5A:
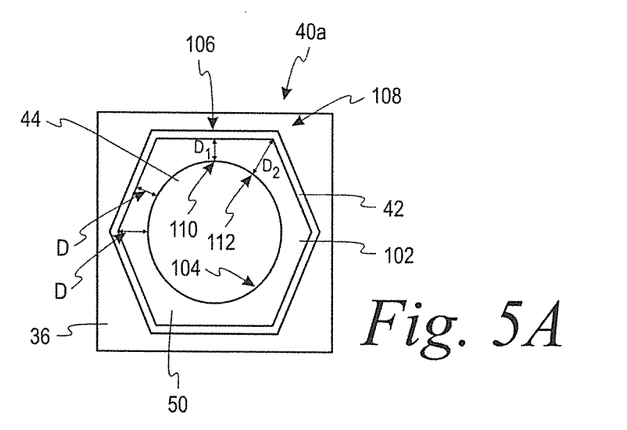
FIG. 5A is a plan view of an example header portion according to aspects of the present disclosure.

FIGS. 5A-5D illustrate plan views of exemplary header portions 40a-40d to evenly distribute contact pressure on a sealing surface 46 along the bead 42 in accord with the present disclosure. FIG. 5A is a plan view of an example header portion 40a to evenly distribute contact pressure along the bead 42. The header portion 40a includes a working face 36 of the plate 12 with a bead 42 thereon. A flange 102 is defined between the bead 42 and the aperture 44 with a flange edge 104 defining the aperture 44. As can be seen, the bead 42 is a first polygon that is generally hexagonal while the aperture 44 is generally circular.

The bead 42 includes a plurality of bead-sides 106 and a bead-corner 108 at the intersection of adjacent bead-sides 106. The flange edge 104 includes a first edge-portion 110 proximate the bead-side 106 and a second edge-portion 112 that is proximate the bead-corner 108. As can be seen in the figure, portions of the bead 42 that correspond to respective portions of the flange edge 104 are disposed in a region extending generally perpendicularly to the flange edge 104.

An edge distance D is defined by the space between the bead 42 and the flange edge 104. A first edge-distance D1 is defined by the space between the bead-side 106 and the first edge-portion 110 and a second edge-distance D2 is defined by the space between the bead-corner 108 and the second edge-portion 112. As can be seen in FIG. 5A, the second edge-distance D2 is greater than the first edge-distance D1. In some aspects, the second edge-distance D2 is 30% greater than the first edge-distance D1. In some aspects, the second edge-distance D2 is 60% greater than the first edge-distance D1. In some aspects, the second edge-distance D2 is 100% greater than the first edge-distance D1.

Figure 5B:
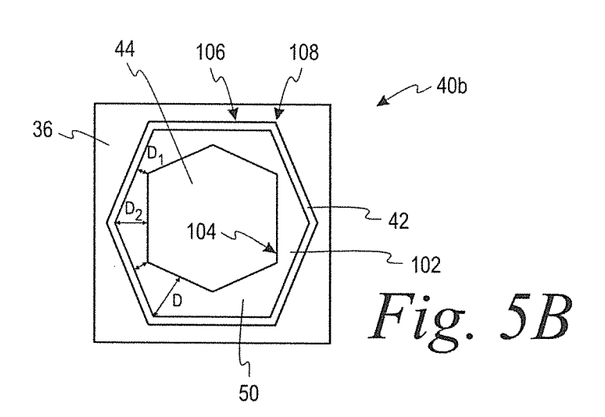
FIG. 5B is a plan view of another example header portion according to aspects of the present disclosure.

FIG. 5B is a plan view of another example header portion 40b to evenly distribute contact pressure along the bead 42. In the illustrated example, the bead 42 is a first polygon that is generally hexagonal and the flange edge 104 is a second polygon that is also generally hexagonal. The first polygon is rotated from the second polygon by about 30° such that each corner of the first polygon is generally adjacent a respective midpoint of each side of the second polygon. The relative rotation of the first polygon from the second polygon makes the second edge-distance D2 greater than the first edge-distance D1. While the illustrated polygon is generally hexagonal, it is contemplated that other polygonal shapes may be used. Further, while the illustrated first polygon is rotated from the second polygon by about 30°, other rotations can be used that result in the second edge-distance D2 being greater than the first edge-distance D1.

Figure 5C:
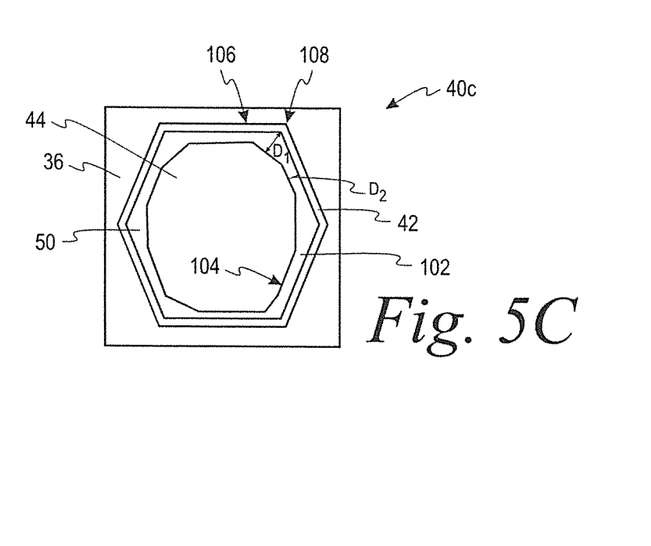
FIG. 5C is a plan view of yet another example header portion according to aspects of the present disclosure.

FIG. 5C is a plan view of yet another example header portion 40c to evenly distribute contact pressure along the bead 42. The bead 42 is a first polygon that is generally hexagonal and the flange edge 104 is a second polygon that includes more corners than the first polygon—e.g., the illustrated second polygon is generally dodecagonal. The second polygon is irregular and oriented relative to the first polygon such that the bead-corners 108 are located proximate a respective side of the second polygon. As can be seen in FIG. 5C, edge distances D for each bead-corner 108 can be different distances even if the bead 42 forms a generally symmetrical shape. For example, structures outside of the bead 42 may affect deflection of the plate 12 such that differing edge distances D at apparently symmetrical regions may improve contact pressure distribution along the sealing surface 46 despite an apparent symmetry of the bead 42 or the aperture 44.

Figure 5D:
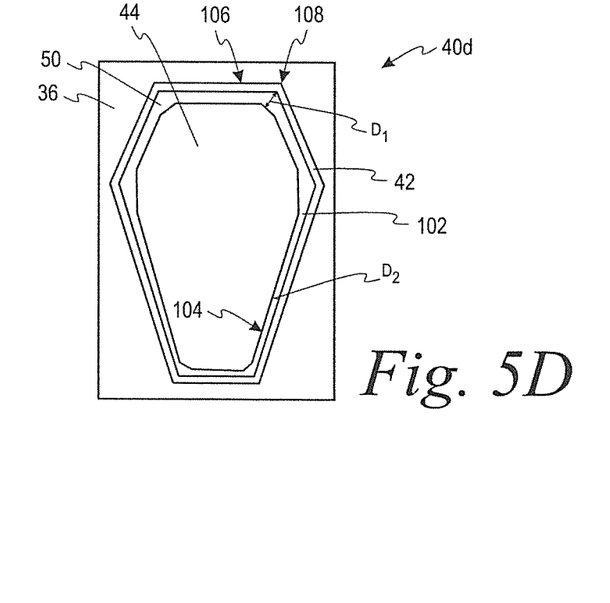
FIG. 5D is a plan view of still yet another example header portion according to aspects of the present disclosure.

FIG. 5D is a plan view of still yet another example header portion 40d to evenly distribute contact pressure along the bead 42. The bead 42 is a first polygon that is generally hexagonal and irregular. The flange edge 104 is a second polygon that is generally dodecagonal and irregular. The second polygon is oriented relative to the first polygon such that the bead-corners 108 are located proximate a respective side of the second polygon.

Figure 6:
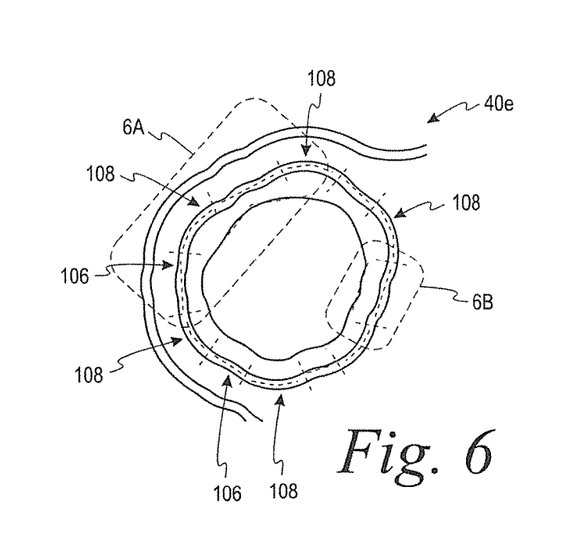
FIG. 6 is a plan view of an example header portion according to aspects of the present disclosure.

FIG. 6 is a plan view of an exemplary header portion 40e to evenly distribute contact pressure along the bead 42. The header portion 40e includes a plurality of bead-sides 106 and bead-corners 108.

Figures 6A, 6B:
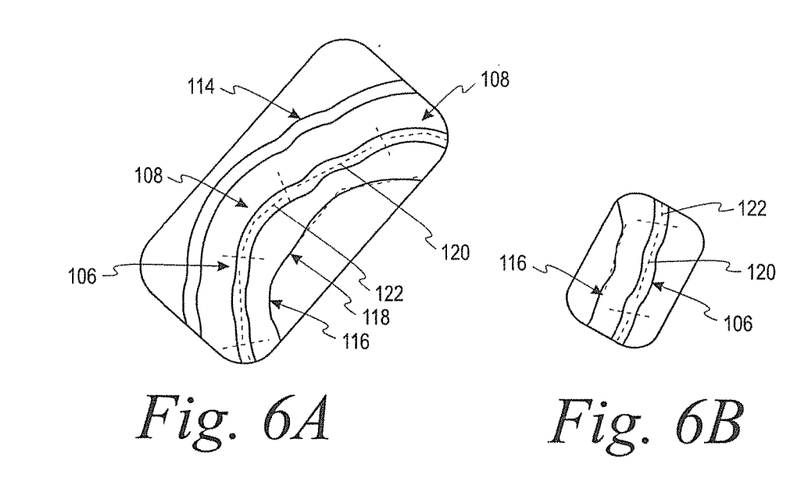
FIG. 6A is an expanded view of a portion of the header portion shown in FIG. 6.
FIG. 6B is an expanded view of a portion of the header portion shown in FIG. 6.

As better shown by FIGS. 6A and 6B, the bead-sides 106 include reinforcement structures 114 or "wiggles" that follow a generally serpentine path. These reinforcement structures 114 are configured to inhibit emergence of weak points along straight runs of the bead 42 by inhibiting excessive deformation of the bead 42 when the plate 12 is compressed in the fuel-cell stack 10. The bead-side 106 is generally linear through the serpentine path of the reinforcement structures as is illustrated by line 120. Notably, the "wiggles" along the serpentine path share a particular radius with first portions being radiused inward and second portions, interposed between the first portions, being radiused outward. For example, the serpentine portion of FIG. 6A includes a central portion being radiused toward the aperture and outer portions radiused away from the aperture 44. The radius of the central portion and the outer portions are generally equal.

The bead-corners 108 are generally radiused toward the aperture 44. Each bead-corner 108 has a generally uniform radius along the bead-corner 108. An angular corner, illustrated by line 122, is shown along the bead 42 of FIGS. 6A and 6B. The radiused bead-corner 108 shares an apex with the corner of line 122. The radii of the bead-corners are generally greater than the radii of the serpentine portions. The bead-corners 108 generally have increased contact pressure nearer the apex and lower contact pressure nearer the bead-sides 106.

While the bead 42 of FIGS. 6, 6A, and 6B includes features that are generally more curved than the angular features illustrated in the beads 42 of FIGS. 5A-5D, one of ordinary skill in the art will readily understand the differences between the bead-sides 106 having serpentine features and bead-corners 108 having a generally continuous radius of curvature. For example, bead-corners 108 may be identified by determining areas of increased contact pressure along the bead 42. In this example, bead-corners 108 will have a contact pressure that is generally higher near the apex and generally lower near the bead-sides 106.

As also shown better in FIGS. 6A and 6B, the flange edge 104 defines a plurality of features. For example, the flange edge 104 may include a first edge-portion 116 disposed proximate the bead-side 106 and a second edge-portion 118 disposed proximate the bead-corner 108. The edge distance along the second edge-portion 118 is generally greater than the edge distance along the first edge-portion 116.

In some aspects, as shown in FIG. 6A, the bead-side 106 is generally linear while the first edge-portion 116 proximate the bead-side 106 is generally radiused. In some aspects, the bead-corner 108 is generally radiused at a first radius while the second edge-portion 118 is generally radiused at a greater radius. In some aspects, as can be further seen in FIG. 6A, the bead-corner 108 is generally radiused while the second edge-portion 118 is generally linear.

In some aspects, as shown in FIG. 6B, both the bead-side 106 and the first edge-portion 116 proximate the bead-side follow a serpentine path such that the edge distance D between the bead-side and the first edge-portion is generally constant.

Beneficially, forming a flange with an edge distance D that is greater near the bead-corners 108 than the edge distance D near the bead-sides evenly distributes contact pressure along the bead 42. In some examples, the edge distances D about the aperture 44 are configured to provide a contact pressure distribution having less than about 50% variance along the bead 42. In some examples, the edge distances D about the aperture 44 are configured to provide a contact pressure distribution having less than about 30% variance along the bead 42.

Determining contact pressure resulting from a particular design may be measured or modeled. For example, a model of a plate 12, a header portion 40, or a flange 50 can employ finite element analysis to estimate contact-pressure distribution along the bead 42 of an exemplary structure.

Figure 7A:
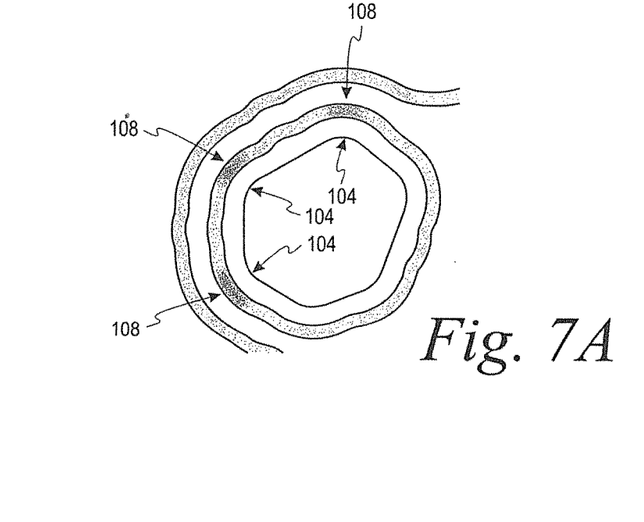
FIG. 7A is a heat map illustrating contact pressure along a bead.
Figure 7B:
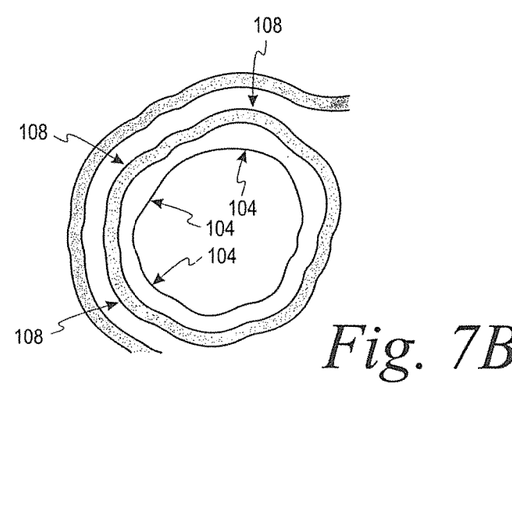
FIG. 7B is a heat map illustrating contact pressure along a bead having varied edge distances according to aspects of the present disclosure.

FIGS. 7A and 7B are heat maps of contact pressure along a bead 42 determined using finite element analysis. FIG. 7A illustrates a header where distances between the bead 42 and respective portions of the flange edge 104 are generally constant. As can be seen, the contact pressure along the sealing surface 46 at the indicated bead-corners 108 is higher than the contact pressure along the sealing surface 46 at the bead-sides 106 adjacent the bead-corners 108. Notably, not all bead-corners 108 include areas of significantly increased contact pressure. For example, the bead-corners 108 illustrated in the upper left of FIG. 7A include noticeably higher contact pressures than the bead-corners 108 illustrated in the lower right of FIG. 7A. Accordingly, edge distances D of certain bead-corners 108 do not need to be increased to obtain a evenly distributed contact pressure.

FIG. 7B is a heat map of contact pressure along a bead 42 for a flange 50 having a variable edge distance D according to aspects of the present disclosure. Notably, FIG. 7B differs from FIG. 7A by the edge distance D being generally greater for the bead-corners 108 that have a relatively higher contact pressure (e.g., bead-corners 108 toward the upper left) and the edge distance D being generally similar for the bead-corners 108 that have a relatively lower contact pressure (e.g., bead-corners 108 toward the lower right). FIG. 7B further differs from FIG. 7A by the edge distance D along the bead-side 106 at the right FIGS. 7A and 7B is generally constant along the serpentine portion of the bead 42.

Figure 8:
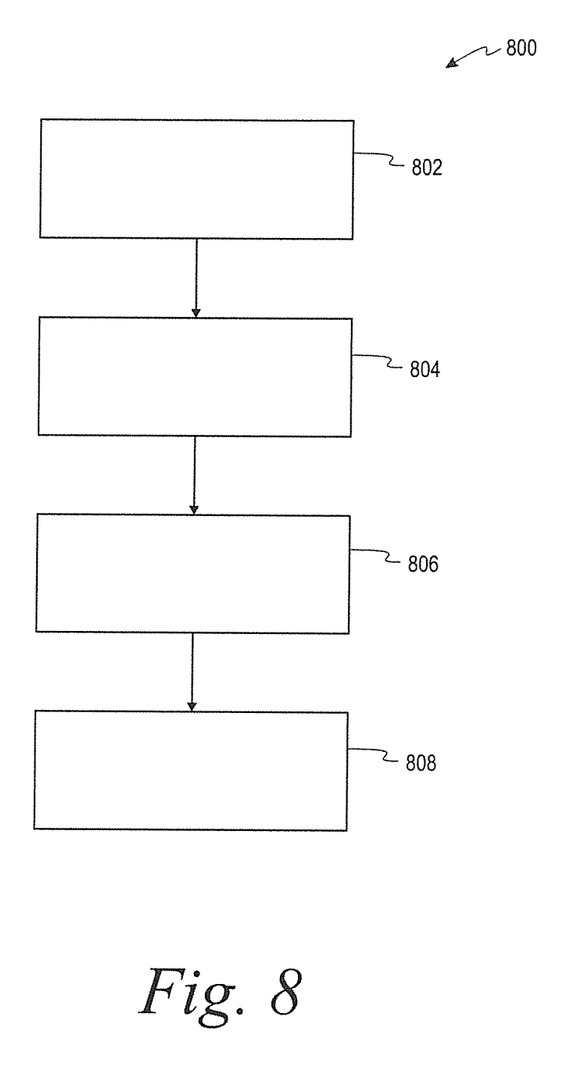
FIG. 8 illustrates a method for designing a flange according to aspects of the present disclosure.

FIG. 8 illustrates a method 800 for designing a flange 50 according to aspects of the present disclosure. The method 800 includes selecting 802 an initial design, measuring 804 contact pressure across the bead 42, analyzing 806 the contact pressure distribution, and reducing 808 variance in the contact pressure distribution. The initial flange design includes at least a portion a plate 12 having an aperture 44 therethrough and a bead 42 surrounding the aperture. Measuring 804 the contact pressure across the bead 42 produces a contact pressure distribution along the bead 42. Measuring 804 the contact pressure can be accomplished using, for example, a mathematical model of the flange 50, direct testing of flange prototypes, in-situ measurements, combinations thereof, and the like. The measuring via a mathematical model can be accomplished using, for example, finite element analysis, other calculation methods, combinations thereof, and the like. Analyzing 806 the contact pressure distribution includes identifying regions of relatively increased contact pressure and regions of relatively decreased contact pressure. Reducing 808 variance in the contact pressure distribution includes increasing an edge distance near one or more of the regions of relatively increased contact pressure and/or decreasing an edge distance near one or more of the regions of relatively decreased contact pressure.

Beneficially, adjacent components including beads 42 thereon can be designed to act cooperatively to evenly distribute contact pressure along the beads 42. For example, a flange 50 of the first plate 12 may include a first design and a corresponding flange 50 of the second plate 12 may include a second design. The first design and the second design may be cooperatively configured such that areas of relatively greater contact pressure along the bead 42 on the first plate 12 correspond to areas of relatively lower contact pressure along the bead 42 of the second plate such that the contact pressure along the sealing surface 46 is yet evenly distributed.

While the above-described regions of increased contact pressure were described with respect to bead-corners, it is contemplated that any region of increased stress can be evenly distributed by increasing plate material adjacent to the region of increased contact pressure and/or decreasing plate material adjacent to the regions of lower contact pressure.

While the best modes for carrying out the disclosure have been described in detail, those familiar with the art to which this disclosure relates will recognize various alternative designs and embodiments for practicing the disclosure within the scope of the appended claims.

What is claimed is:

1. A plate comprising:
   a bead including a bead-side and a bead-corner; and
   a flange edge defining an aperture through the plate;
      wherein the flange edge includes a first edge-portion proximate the bead-side and a second edge-portion proximate the bead-corner;
      wherein the bead-side and the first edge-portion define a first edge-distance therebetween;
      wherein the bead-corner and the second edge-portion define a second edge-distance therebetween;
      wherein the second edge-distance is greater than the first edge-distance; and
      further wherein the bead generally defines a first polygon and the flange edge generally defines a second polygon, the second polygon including more corners than the first polygon.

2. The plate of claim 1, wherein the bead-side is generally linear and the bead-corner is generally radiused.

3. The plate of claim 1, wherein the first edge-portion is generally radiused and the second edge-portion is generally linear.

4. The plate of claim 1, wherein the bead includes a sealing surface thereon, the sealing surface being configured to deflect when exposed to a contact pressure.

5. The plate of claim 1, further including:
   a second bead having a second bead-side and a second bead-corner; and
   a second flange edge having a third edge-portion that is proximate the second bead-corner;
   wherein the second bead-corner and the third edge-portion define a third edge-distance therebetween;
   wherein the bead-corner defines a first radius and the second bead-corner defines a second radius that is greater than the first radius; and
   further wherein the second edge-distance is greater than the third edge-distance.

6. The plate of claim 1, wherein the bead-side forms a serpentine path, and wherein the first edge-portion follows the serpentine path such that the first edge-distance is generally constant along the serpentine path.

7. The plate of claim 1, wherein the first edge-distance and the second edge-distance are configured to provide a contact pressure having less than about 50% variance along the bead.

8. The plate of claim 1, wherein the first edge-distance and the second edge-distance are configured to provide a contact pressure having less than about 30% variance along the bead.

9. A system comprising:
   a first plate including:
      a bead having a bead-side and a bead-corner; and
      a flange edge defining a first aperture through the first plate;
      wherein the flange edge includes a first edge-portion proximate the bead-side and a second edge-portion proximate the bead-corner;
      wherein the bead-side and the first edge-portion define a first edge-distance therebetween;
      wherein the bead-corner and the second edge-portion define a second edge-distance therebetween;
      wherein the second edge-distance is greater than the first edge-distance; and
      further wherein the bead generally defines a first polygon and the flange edge generally defines a second polygon, the second polygon including more corners than the first polygon;
   a second plate abutting the first plate, the second plate defining a second aperture therethrough that is aligned with the first aperture; and
   a compressive member configured to exert a compressive force on the first plate and the second plate, wherein the compressive force is configured to seal the first plate and the second plate along the bead.

10. The system of claim 9, wherein the second plate further includes:
    a second bead having a second bead-side and a second bead-corner; and
    a second flange edge defining the second aperture, the second flange edge including a third edge-portion proximate the second bead-side and a fourth edge-portion proximate the second bead-corner;
    wherein the second bead-side and the third edge-portion define a third edge-distance therebetween; and
    wherein the second bead-corner and the fourth edge-portion define a fourth edge-distance therebetween, the fourth edge-distance being greater than the third edge-distance.

11. The system of claim 10, wherein:
    the first plate further includes a first working face having the bead disposed thereon and a first rear face opposite the first working face; and
    the second plate further includes a second working face having the second bead disposed thereon and a second rear face opposite the second working face;
    wherein the first rear face is disposed adjacent the second rear face;
    wherein the first plate is attached to the second plate;
    wherein the bead produces a first contact pressure distribution with a portion of relatively higher contact pressure;
    wherein the second bead produces a second contact pressure distribution with a portion of relatively lower contact pressure; and
    further wherein the bead and the second bead are cooperatively configured such that the portion of relatively higher contact pressure is disposed relatively adjacent the portion of relatively lower contact pressure.

12. The system of claim 10, wherein the bead produces a first contact pressure distribution with a portion of relatively higher contact pressure;
    wherein the second bead produces a second contact pressure distribution with a portion of relatively lower contact pressure; and
    wherein a first sealing surface of the bead abuts a second sealing surface of the second bead such that the portion of relatively higher contact pressure abuts the portion of relatively lower contact pressure.

13. The system of claim 9, wherein the first edge-portion is generally radiused and the second edge-portion is generally linear.

14. The system of claim 9, wherein the bead-side forms a serpentine path, and wherein the first edge-portion follows the serpentine path such that the first edge-distance is generally constant along the serpentine path.

15. The system of claim 9, wherein the bead-side is generally radiused and the bead-corner is generally linear.

16. A fuel-cell stack comprising:
a first plate including:
a first working face defining a plurality of first reactant channels;
a bead disposed on the first working face, the bead having a bead-side and a bead-corner; and
a first flange edge defining a first aperture through the first plate, the first flange edge including a first edge-portion proximate the bead-side and a second edge-portion proximate the bead-corner;
wherein the first edge-portion and the bead-side define a first edge-distance therebetween;
wherein the second edge-portion and the bead-corner define a second edge-distance therebetween;
wherein the second edge-distance is greater than the first edge-distance; and
further wherein the bead generally defines a first polygon and the flange edge generally defines a second polygon, the second polygon including more corners than the first polygon;
a second plate including:
a second working face defining a plurality of second reactant channels; and
a second flange edge defining a second aperture through the second plate, the second aperture being aligned with the first aperture;
a unified electrode assembly disposed between the first plate and the second plate, the unified electrode assembly including a first side contacting the plurality of first reactant channels and a second side contacting the plurality of second reactant channels; and
a compressive member configured to exert a compressive force on the first plate, the second plate, and the unified electrode assembly;
wherein the compressive force is configured to apply a contact pressure to the bead to provide a substantially fluid-tight seal between the bead and the second plate or the unified electrode assembly.

17. The fuel-cell stack of claim 16, wherein the substantially fluid-tight seal is provided between the bead and the second plate.

18. The fuel-cell stack of claim 16, wherein the bead-side is generally linear and the bead-corner is generally radiused.

19. The fuel-cell stack of claim 16, wherein the first edge-distance and the second edge-distance are configured to provide a contact pressure having less than about 50% variance along the bead.

* * * * *